Figure 1:
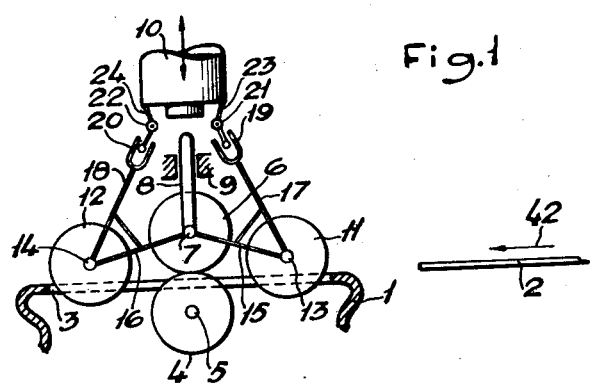

June 4, 1957  H. V. DANIELSSON  2,794,258
ARRESTING DEVICE FOR MEASURING INSTRUMENTS
Filed July 3, 1953  4 Sheets-Sheet 1

June 4, 1957  H. V. DANIELSSON  2,794,258
ARRESTING DEVICE FOR MEASURING INSTRUMENTS
Filed July 3, 1953  4 Sheets-Sheet 2
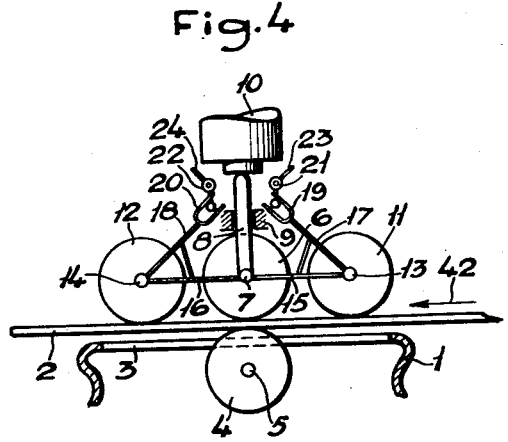
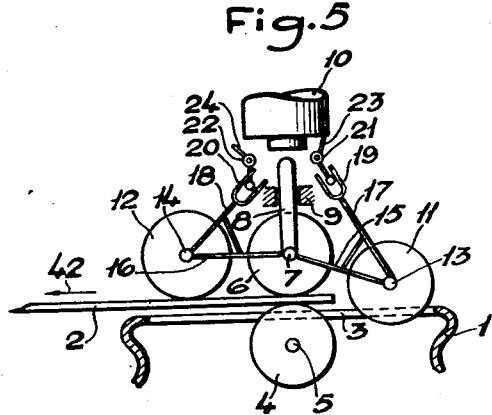

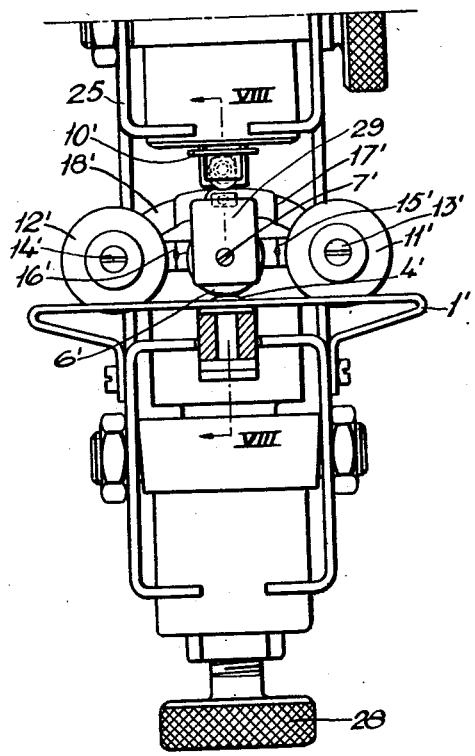
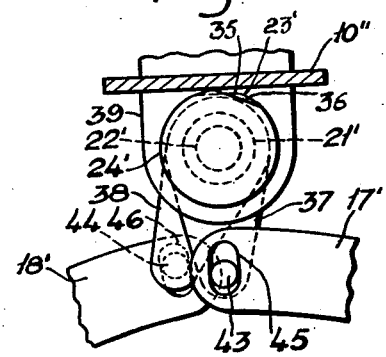

June 4, 1957  H. V. DANIELSSON  2,794,258
ARRESTING DEVICE FOR MEASURING INSTRUMENTS
Filed July 3, 1953  4 Sheets-Sheet 4

United States Patent Office 2,794,258
Patented June 4, 1957

2,794,258
ARRESTING DEVICE FOR MEASURING INSTRUMENTS

Holger Viktor Danielsson, Stockholm, Sweden, assignor to Aktiebolaget C. E. Johansson, Eskilstuna, Sweden, a company of Sweden Application July 3, 1953, Serial No. 366,005

2 Claims. (Cl. 33—147)

The present invention relates to an arresting or checking device for measuring instruments of the kind which are provided with a movable measuring member which is adapted to be moved by an object such as a metal band, a strip of sheet metal, or the like, the thickness of which is to be measured, and which is moved past the measuring member, which latter is directly or indirectly connected with an indication or recording device which serves to indicate and/or record the thickness of the object being measured. The indication or recording device and the connection between the measuring member and said device do not form part of this invention. In the use of measuring instruments of the above mentioned kind the measuring operation is intermittent, as the measuring operation ceases as soon as an object to be measured has moved entirely past the measuring member. In measuring instruments of this kind the indication device is often combined with signal devices which are caused to function if the thickness of an object to be measured which is moved past the measuring member, falls outside certain predetermined positive or negative tolerance limits. When such instruments are used the said signalling devices will be caused to function as soon as the measured objects have moved past the measuring member and no longer actuate the same, which may tend to disturb the operator of the measuring instrument. Also, there is risk of the sensitive indication device being damaged due to the shocks that may occur when an object that has been measured, moves out of contact with the measuring member, and when the next object comes in contact with said member.

The purpose of the arresting device which forms the subject of the present invention is to eliminate these disadvantages. The invention is broadly characterized by a movably supported feeler member being provided in such position relatively to the measuring member that said feeler member will be contacted by the object to be measured which is moved towards the measuring member, before or at the latest simultaneously with such object making contact with the measuring member, said feeler member being connected to a checking or arresting member which serves to arrest the indication or recording device, or a member serving to transmit the movement of the measuring member to the said device, when no object moves through the apparatus. In this way the indication or recording device is rendered inoperative when no measuring operation is in progress, and it is connected to the measuring member only when a measuring operation is in progress.

When rolling metal bands and the like the portions of the band adjacent the ends thereof, having a length, for instance, of approximately 40 mm., usually fall considerably short of the desired dimension, so that the thickness of the said end portions fall outside the predetermined negative tolerance limits. In view hereof it may be advantageous in practice to construct the arresting device in such manner that the indication or recording device is held inoperative also when the said undersized portions move past the measuring member. With this purpose in view the arresting device can be provided with two movable feeler members, one of which is located in front of the measuring member, and the second of which is located to the rear of the measuring member, taken in the direction of movement of the object, the first feeler member being so positioned that the moving object comes in contact with the said feeler member before it comes in contact with the measuring member, and thus, the object will also move out of contact with the feeler member before its rear end has passed the measuring member, and the second feeler member being so positioned that the moving object will contact said second feeler member only after said object has made contact with the measuring member, the said feeler members being connected to arresting members which are adapted to arrest the indication or recording device, or a member serving to transmit the movement of the measuring member to said device, as long as any of the two feeler members is not in contact with the moving object.

Figure 7:
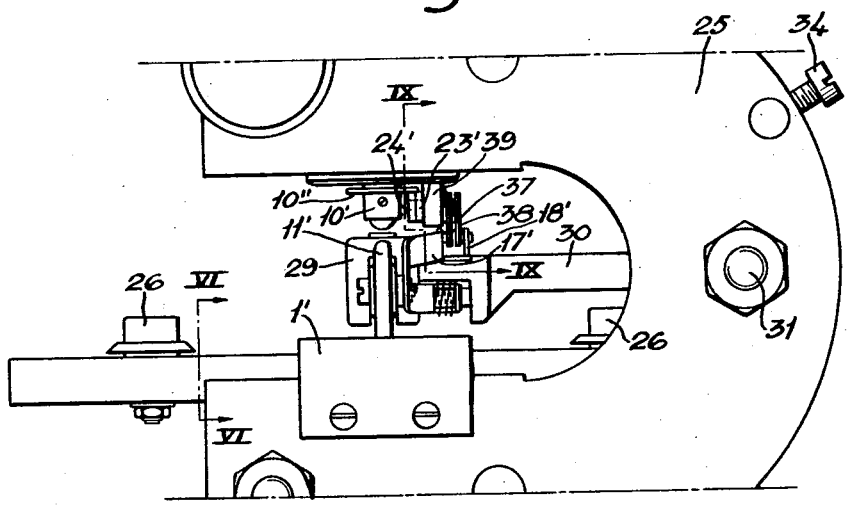
Figure 8:
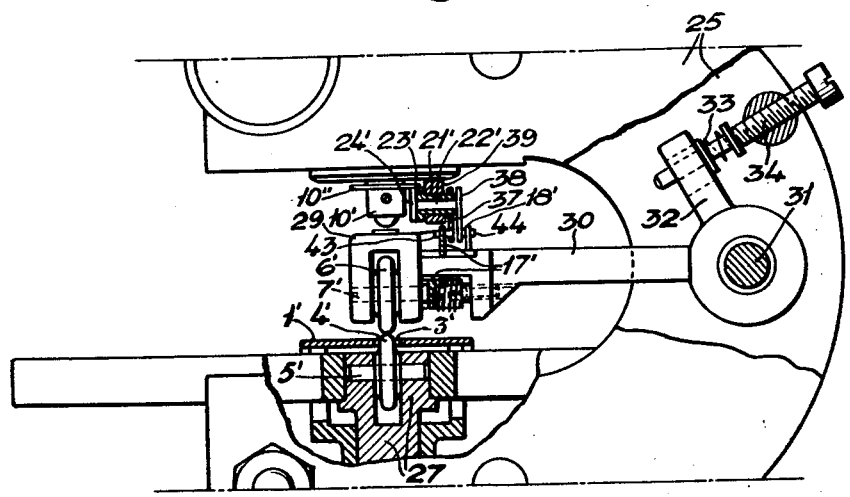

The accompanying drawings illustrate by way of example a constructional form of the invention arranged in the last mentioned manner. Figs. 1, 2, 3, 4, and 5 are schematic views showing the measuring member and parts cooperating therewith, and the two feeler members and the arresting members connected thereto, the figures showing these members in the different positions which they occupy during different stages of the movement of an object past the measuring member. Figs. 6 to 8 inclusive show the parts that are essential to the present invention, of a measuring instrument provided with an arresting device according to the invention. Fig. 6 is a front view, partly in section on the line VI—VI in Fig. 7, of a portion of the instrument, Fig. 7 shows a side elevation of the instrument viewed from the right in Fig. 6, and Fig. 8 shows a similar side elevation, partly in vertical section on the line VIII—VIII in Fig. 6. Fig. 9 is a sectional view taken on the line IX—IX in Fig. 7 and showing the arresting members.

Referring to the construction schematically illustrated in Figs. 1 to 5 inclusive, 1 denotes a table over which the object, such as a rolled metal band 2, the thickness of which is to be measured, is caused to move in the direction of the arrows 42. The table 1 is provided with a slot 3 which extends in the said direction of movement of the band. Projecting through and above the said slot 3 is the upper portion of a supporting roller 4 which is rotatably journalled below the table on a shaft 5 which extends at right angles to the direction of movement of the band 2 and is journalled in a part of the instrument which is adjustable in a vertical direction. The band 2 passes over the said supporting roller 4 during the measuring operation. Positioned vertically above the said roller 4 is the measuring member which in the instance illustrated consists of a roller 6 which is rotatable on a shaft 7 parallel to the shaft 5, and is journalled in a yoke 8 or the like which is displaceable vertically in a suitable guide 9, in such manner that the measuring roller 6 is only capable of moving up and down in the vertical plane through the two shafts 5 and 7, but is incapable of moving to the right or to the left in Figs. 1 to 5 inclusive. While the measuring operation is in progress the yoke 8 is adapted to bear against a measuring plunger 10, see Fig. 4. Said plunger 10 is movable vertically in the frame of the measuring instrument, not shown, and it serves to transmit the movements of the measuring member 6 to the indication or recording device, not shown, of the instrument.

According to the invention, two feeler members 11 and 12 are provided, the member 11 being positioned in front of the measuring member 6, and the member 12 being positioned to the rear of said member 6, taken in the direction of movement of the band 2. In the instance illustrated, these feeler members 11 and 12 consists of rollers which are rotatable on shafts 13 and 14, respectively, which are parallel to the shaft 7 and which are journalled in levers 15 and 16, respectively, which are swingably journalled on the shaft 7 of the measuring roller 6, so that the feeler rollers 11 and 12 can swing up and down about the said shaft 7. Rigidly attached to the two levers 15 and 16 are arms 17 and 18, respectively, each of which is directed obliquely upwards at an acute angle to the respective lever. The upper ends of said arms 17 and 18 are formed as forks 19 and 20, respectively, which serve to actuate the corresponding arresting members which, in this instance, consist of two small bell crank levers 23 and 24, respectively, pivoted on fixed shafts 21 and 22, respectively. These arresting members 23 and 24 serve to arrest the measuring plunger 10 in a raised position when no object is being moved below the measuring roller 6, and no measuring operation is to take place. The distance between the feeler roller 11 and the measuring roller 6, taken in the direction of movement of the band 2, should at least be equal to the length of that end portion of the band which has become undersized in the process of rolling the band, thus in the example above assumed, the distance should be about 40 mm. This applies also to the distance between the measuring roller 6 and the feeler roller 12.

Figure 2:
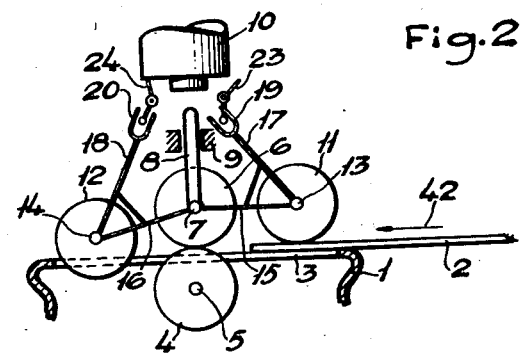
Figure 3:
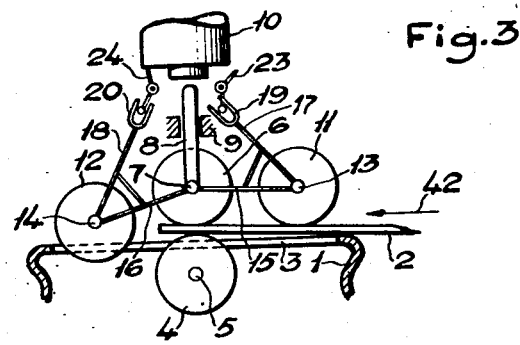

Fig. 1 shows the various members in the positions occupied before the forward end of the band 2 arrives at the first feeler roller 11. Both arresting members 23 and 24 are then positioned below the lower face of the measuring plunger 10, thus holding this plunger as well as the indication device arrested. When the forward end of the band 2 moves in below the roller 11, said roller is swung upwards, as shown in Fig. 2, which movement results in the arresting member 23 being moved out of the path of movement of the measuring plunger 10. Said plunger, however, is still arrested by the second arresting member 24, which will remain in this position also when the forward end of the band 2 moves in below the measuring roller 6, as shown in Fig. 3. While the measuring roller 6 is then raised some distance from the position shown in Fig. 2, still, the thickness of the forward end of the band being assumed to be undersized, the measuring roller 6 is not raised so far that the upper end of the yoke 8 makes contact with the measuring plunger 10. Thus, no measuring operation takes place as yet. The measuring operation does not begin until the forward end of the band 2 runs in below the feeler roller 12 and moves this roller upwards, so that the arresting member 24 is moved out of the path of the measuring plunger 10 and releases the latter. The forward undersized end of the band 2 is assumed then to have passed the measuring roller 6. During the measuring operation the upper end of the yoke 8 bears against and actuates the measuring plunger 10, see Fig. 4, whereby such movements of the measuring roller 6 in the vertical direction as may be caused by variations in the thickness of the band 2, are transmitted to the indication device. The measuring operation proceeds in this manner until the rear end of the band 2 passes the feeler roller 11, which is assumed to occur immediately before the undersized rear end of the band moves in below the measuring roller 6. When the roller 11 is unsupported by the band 2, it moves downwards, as shown in Fig. 5, actuated by its own weight or, if desired, by a spring, not shown, and this movement of the roller 11 causes the arresting member 23 to turn into engagement with the measuring plunger 10 which is thus again arrested. Finally, when the rear end of the band 2 passes the roller 12, also the second arresting member 24 is moved into engagement with the measuring plunger 10, so that the various parts again assume the positions shown in Fig. 1. In this way the result is attained that the plunger 10 which serves to transmit the movements of the measuring member 6 to the indication device, is held arrested as long as either of the two feeler members 11 and 12 does not contact the band 2.

The principle of the arresting device and its function having been described, the constructional form of an arresting device according to this invention as applied to a measuring instrument illustrated in Figs. 6 to 9, inclusive, will now be explained. In these figures, those parts to which there are corresponding parts in Figs. 1 to 5, inclusive, are marked with the same reference numerals as in Figs. 1 to 5, though each is provided with a prime. Thus, part 1' in Figs. 6, 7, and 8 corresponds to part 1 in Figs. 1 to 5 inclusive, and so forth.

Referring to Figs. 6 to 9, inclusive, reference numeral 25 denotes a portion of the frame of the measuring instrument. Said frame is assumed to be supported by a suitable base, not shown in the drawing, and to support at its upper portion the indication device which forms no part of the present invention and which, therefore, is not shown in the drawing. The indication device may be of any kind suited to the purposes of this invention, and it may comprise, for instance, a pointer movable over a scale. The frame 25 supports the table 1' over which the metal band, the thickness of which is to be measured, is caused to move. The frame 25 supports two guide rollers 26 which are adjustable in a direction at right angles to the direction of movement of the band, and which serve to guide the band laterally. The shaft 5' of the support roller 4' which projects upwards through the slot 3', Fig. 8, in the table 1', is journalled in a slide 27 which is movable vertically in the frame 25 and the position of which may be adjusted by means of an adjustment screw 28, Fig. 6, by means of which it is possible, after interposition of a gauge block or other distance piece between the support roller 4' and the measuring roller 6', if desired or necessary, to adjust the pointer of the indication device to any desired initial position.

In the construction illustrated, the measuring roller 6' is not mounted in a member that is rectilinearly movable in a fixed guide. Instead, the shaft 7', Figs. 6 and 8, of the measuring roller 6' is journalled in a yoke 29 at the outer end of a lever 30, which is journalled on a fixed shaft 31 in the frame 25 and is rigidly connected to a second lever 32 which is actuated by a spring 33 the tension of which can be adjusted by means of an adjustment screw 34 the free end of which extends through an opening in the lever 32. The screw 38 serves to adjust the pressure at which the measuring roller 6' bears against the support roller 4', or against the metal band moving over said roller 4'. It will be seen that also with this arrangement the shaft 7' of the measuring roller 6' can move up and down in the vertical plane through the shaft 5' of the support roller 4', but is prevented from movement to the right and to the left in Fig. 6.

Also in this construction the two feeler rollers 11' and 12' are journalled on shafts 13' and 14' in levers 15' and 16', respectively, which are journalled on and capable of swinging about the shaft 7' of the measuring roller 6'. Said levers 15' and 16' are provided with arms 17' and 18', respectively, which serve to actuate the two arresting members 23' and 24', respectively. The last mentioned members 23' and 24' consist of circular disks which are positioned adjacent one another and are attached each to one shaft 21' and 22', respectively, the shaft 22' being journalled in the shaft 21' which is tubular and which is journalled in a lug 39 depending from the frame 25. The two disks 23' and 24' are adapted to bear with their circumferences against the lower face of a flange 10" on the measuring plunger 10'. Each disk 23' and 24' is provided at a suitable point on its circumference with a plane surface 35 and 36, respectively, see Fig. 9. Attached to the ends of the shafts 21' and 22' remote from the disks 23' and 24' are arms 37 and 38, respectively, which carry pins 43 and 44, respectively, which engage slots 45 and 46, respectively, in the ends of the arms 17' and 18', and thus connect said first named arms 37 and 38 to the arms 17' and 18', so that the disks 23' and 24' can be rotated by the feeler rollers 11' and 12' in a manner corresponding to that above described in respect of the arresting members 23 and 24 in Figs. 1 to 5, inclusive. When due to upward movement of the feeler rollers 11' and 12' both disks 23' and 24' have been turned to such positions that their plane surfaces 35 and 36 are directed towards the lower surface of the flange 10" on the measuring plunger 10', the measuring plunger 10' is released so that it can be actuated by the measuring roller 6', and the measuring operation will commence. Also with this construction, therefore, the result above mentioned is attained, viz. that the measuring plunger 10' which serves to transmit the movement of the measuring member 6' to the indication device, is held in arrested position as long as either of the two feeler members 11' and 12' is not in contact with the moving metal band.

I claim:

1. An arresting device for a measuring instrument of the character described, comprising a movable measuring member which is adapted to be actuated and moved by an object the thickness of which is to be measured and which is moved past said member in contact therewith, a movement transmitting member adapted to be actuated by said measuring member to transmit motion therefrom, two feeler members both movable into and out of the path of movement of the object to be measured, one of said feeler members being positioned at a distance in front of said measuring member taken in the direction of movement of the said object such that the moving object makes contact with said feeler member before it makes contact with said measuring member, and the second feeler member being positioned at a distance to the rear of the measuring member such that the moving object makes contact with said second feeler member after it has made contact with said measuring member, and two arresting members movable into and out of the path of movement of said motion transmitting member, each of said arresting members being operatively connected to one of said feeler members in such manner that each of said arresting members occupies a position in the path of movement of said motion transmitting member and arrests said member when its associated feeler member occupies a position in the path of movement of the object to be measured.

2. An arresting device as defined in claim 1, in which the measuring member comprises a yoke movable in a direction substantially perpendicular to the path of movement of the object to be measured, a shaft journalled in said yoke at right angles to the direction of movement of said yoke and to the path of movement of the said object, and a roller rotatably mounted on said shaft and adapted to make contact with the object being measured, and in which each feeler member comprises a lever swingably mounted on said shaft of said measuring member, a second shaft mounted in said lever in a direction parallel to said first named shaft, and a roller rotatably mounted on said second shaft and adapted to make contact with the object to be measured when moved towards said measuring member.

References Cited in the file of this patent

UNITED STATES PATENTS

| 2,011,931 | Dreyer | Aug. 20, 1935 |
| 2,219,621 | Buccione | Oct. 29, 1940 |

FOREIGN PATENTS

| 878,443 | France | Jan. 20, 1943 |